United States Patent
Komoda et al.

(10) Patent No.: US 6,737,787 B2
(45) Date of Patent: May 18, 2004

(54) ULTRASONIC MOTOR AND STATOR FOR ULTRASONIC MOTOR

(75) Inventors: Masahiko Komoda, Toyokawa (JP); Yukiyasu Kato, Iwata (JP)

(73) Assignee: ASMO Co., Ltd., Shizuoka-ken (JP)

( * ) Notice: Subject to any disclaimer, the term of this patent is extended or adjusted under 35 U.S.C. 154(b) by 0 days.

(21) Appl. No.: 10/326,686

(22) Filed: Dec. 20, 2002

(65) Prior Publication Data

US 2003/0117040 A1 Jun. 26, 2003

(30) Foreign Application Priority Data

Dec. 21, 2001 (JP) .................................. 2001-389536

(51) Int. Cl.⁷ .............................................. H02N 2/12
(52) U.S. Cl. .......................... 310/323.04; 310/323.01; 310/323.12; 310/325
(58) Field of Search ................. 310/323.01–323.05, 310/323.09, 323.12, 325

(56) References Cited

U.S. PATENT DOCUMENTS

| 4,038,570 A | * | 7/1977 | Durley, III | 310/318 |
| 4,193,009 A | * | 3/1980 | Durley, III | 310/323.19 |
| 5,410,204 A | * | 4/1995 | Imabayashi et al. | 310/323.13 |
| 6,166,477 A | * | 12/2000 | Komoda et al. | 310/323.13 |
| 6,380,660 B1 | * | 4/2002 | Maeno et al. | 310/323.02 |
| 6,404,104 B1 | * | 6/2002 | Maeno et al. | 310/323.02 |

FOREIGN PATENT DOCUMENTS

| JP | 8-308268 | | 11/1996 | ............ H02N/2/00 |
| JP | 10-337051 | | 12/1998 | ............ H02N/2/00 |
| JP | 2002-112561 | * | 4/2002 | ............ H02N/2/00 |
| JP | 2002-199754 | * | 7/2002 | ............ H02N/2/00 |
| JP | 2002-199755 | * | 7/2002 | ............ H02N/2/00 |
| JP | 2003-111452 | * | 4/2003 | ............ H02N/2/00 |

* cited by examiner

*Primary Examiner*—Thomas M. Dougherty
(74) *Attorney, Agent, or Firm*—Sheridan Ross PC

(57) ABSTRACT

An ultrasonic motor has a stator and a rotor which is press fit to the stator and rotates in accordance with the vibration of the stator. The stator includes a pair of metal blocks, a piezoelectric element located between the metal blocks, a tightening member and a positioning member. The tightening member is inserted through the metal blocks and the piezoelectric element to tighten the metal blocks and the piezoelectric element in the axial direction. The positioning member determines the radial position of the metal blocks. This reduces misalignment of metal blocks and the tightening member, and the stator for the ultrasonic motor.

13 Claims, 4 Drawing Sheets

ULTRASONIC MOTOR AND STATOR FOR ULTRASONIC MOTOR

BACKGROUND OF THE INVENTION

The present invention relates to an ultrasonic motor and a stator for an ultrasonic motor.

As shown in FIG. 4, a typical progressive wave type (or bolted Langevin type) ultrasonic motor includes a stator 51 and a rotor 52. The stator 51 includes first and second blocks 53, 54, which are made of metal, first and second piezoelectric elements 55, 56, first to third electrode plates 57 to 59, and a tightening member, which is a bolt 60. The first and second blocks 53, 54, the first and second piezoelectric elements 55, 56, and the first to third electrode plates 57 to 59 are piled in layer to form a substantially columnar shape. The first and second blocks 53, 54 are tightened by the bolt 60, which is inserted through the first and second blocks 53, 54 in the axial direction. This couples the first and second blocks 53, 54, the first and second piezoelectric elements 55, 56, and the first to third electrode plates 57 to 59.

A slit, which is not shown, is formed at the outer circumference of the lower portion of the stator 51, or the outer circumference of the second block 54. The slit generates torsional vibration based on the axial vibration.

The rotor 52 is substantially cylindrical and is rotatably pressed against the upper surface of the stator 51, or the upper surface of the block 53, by a pressing mechanism, which is not shown.

When high-frequency voltage is applied to the first to third electrode plates 57 to 59, the first and second piezoelectric elements 55, 56 generate axial vibration. Then, the torsional vibration is generated at the slit of the second block 54. The axial vibration of the stator 51 causes levitation force, and the torsional vibration causes driving force. The levitation force and the driving force cause the rotor 52 to rotate.

The first and second blocks 53, 54 are assembled by tightening the male screw of the bolt 60 to the female screws of the first and second blocks 53, 54. This determines the positions of the first and second blocks 53, 54 in the radial direction. Since the positions of the first and second blocks 53, 54 and the bolt 60 are determined only by the male and female screws, the first and second blocks 53, 54 could be misaligned. Therefore, manufacturing deviations are caused per stator 51, which causes variations in the rotational characteristics (such as frequency-rotational speed characteristic, voltage-torque characteristic, and the like) per product. Therefore, the rotor 52 cannot be used for purposes in which a high-accuracy rotational control is required (such as for rotating a drum in a copying machine). This limits the field of application of the ultrasonic motor.

SUMMARY OF THE INVENTION

Accordingly, it is an objective of the present invention to provide an ultrasonic motor that has a simple structure and reduces misalignment of metal blocks and a tightening member, and a stator for the ultrasonic motor.

To achieve the above objective, the present invention provides an ultrasonic motor, which includes a stator and a rotor. The stator includes a pair of metal blocks, a piezoelectric element, a tightening member, and a positioning member. The piezoelectric element is located between the metal blocks. When drive voltage having a predetermined frequency is applied to the piezoelectric element, the piezoelectric element vibrates the stator. The tightening member is inserted through the metal blocks and the piezoelectric element to tighten the metal blocks and the piezoelectric element in the axial direction. The positioning member determines the radial position of the metal blocks. The rotor is press fit to the stator and rotates in accordance with the vibration of the stator.

The present invention also provides a stator located in an ultrasonic motor, which includes a pair of metal blocks, a piezoelectric element, a tightening member, and a positioning member. The piezoelectric element is located between the metal blocks. When drive voltage having a predetermined frequency is applied to the piezoelectric element, the piezoelectric element vibrates the stator. The tightening member is inserted through the metal blocks and the piezoelectric element to axially tighten the metal blocks and the piezoelectric element. The positioning member determines the position of the metal blocks in the radial direction.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
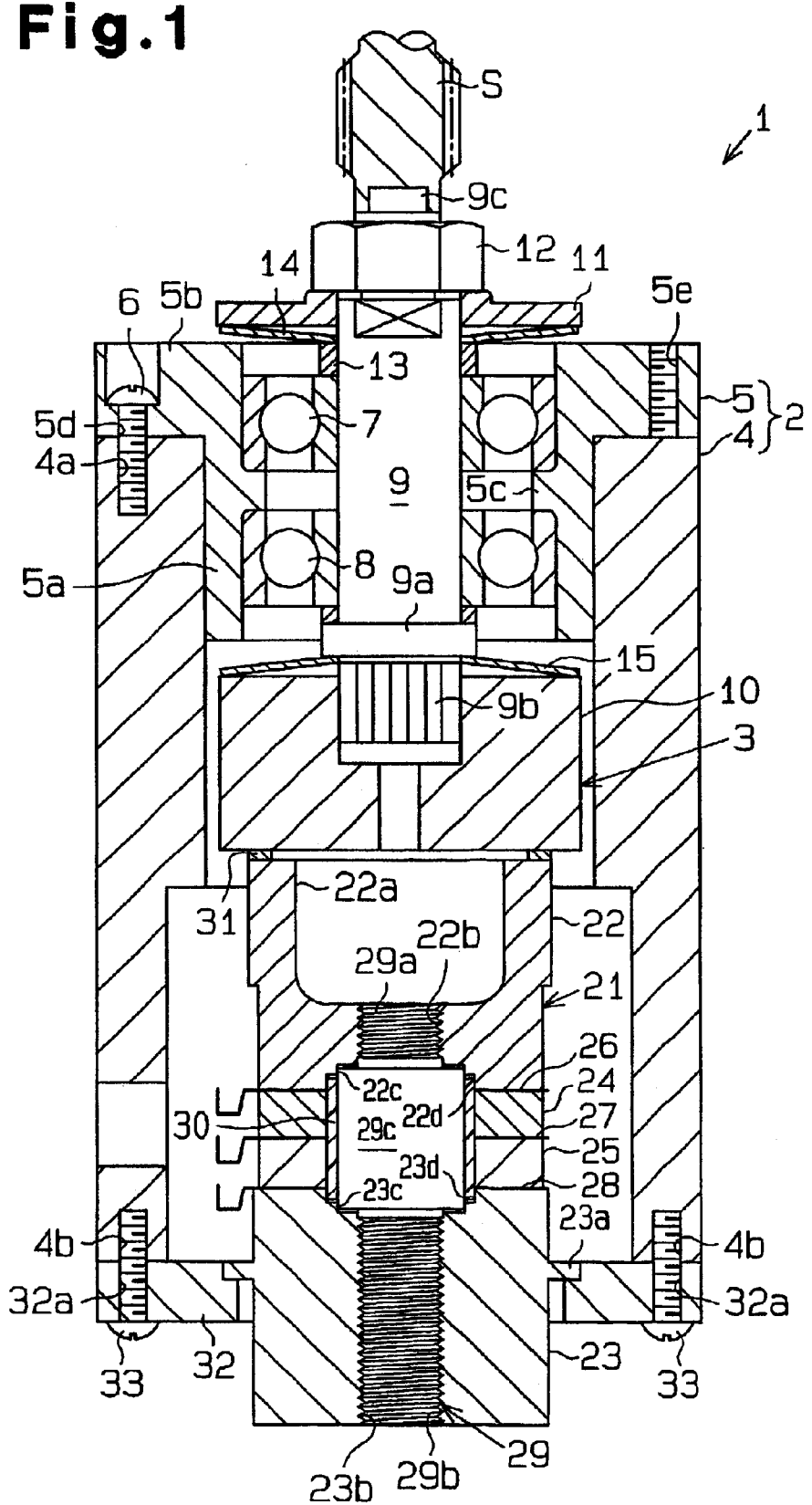
FIG. 1 is a partial cross-sectional view illustrating an actuator according to one embodiment of the present invention.

An actuator 1 according to a preferred embodiment of the present invention will now be described with reference to FIGS. 1 to 2(b). The actuator 1 has a housing 2 and a progressive wave type ultrasonic motor 3.

The housing 2 includes first and second housing members 4, 5. The first housing member 4 is substantially cylindrical. First screw holes 4a (only one is shown in FIG. 1) are formed at the distal end (upper end as viewed in FIG. 1) of the first housing member 4. Second screw holes 4b (only two are shown in FIG. 1) are formed at the proximal end (lower end as viewed in FIG. 1) of the first housing member 4.

The second housing member 5 includes a cylindrical portion 5a, an extended portion 5b, which extends radially outward from the distal end (upper end as viewed in FIG. 1) of the cylindrical portion 5a, and an annular projection 5c, which projects inward from the axially middle portion of the cylindrical portion 5a. The outer diameter of the cylindrical portion 5a is substantially the same as the inner diameter of the distal end of the first housing member 4. Threaded through holes 5d are extend axially through the extended portion 5b at portions corresponding to the first screw holes 4a of the first housing member 4. Screw holes 5e (only one is shown in FIG. 1) are formed in the extended portion 5b for securing the extended portion 5b to an external member.

The second housing member 5 is secured to the first housing member 4 by screws 6, which are screwed to the first screw holes 4a through the threaded through holes 5d.

First and second ball bearings 7, 8 are located inside the cylindrical portion 5a of the second housing member 5. The first ball bearing 7 is located such that the outer ring of the first ball bearing 7 is located between the distal end of the cylindrical portion 5a and the annular projection 5c. The second ball bearing 8 is located such that the outer ring of the second ball bearing 8 is located between the proximal end of the cylindrical portion 5a and the annular projection 5c.

A rotary shaft 9 is supported by the first and second ball bearings 7, 8. The rotary shaft 9 has a flange 9a, which extends radially outward of the rotary shaft 9. A protrusion 9b, on which engaging grooves are formed, is located at the proximal end of the rotary shaft 9. A rotor 10, which is substantially columnar and forms part of the ultrasonic motor 3, is secured to the protrusion 9b. The rotor 10 does not rotate relative to the protrusion 9b.

A first disk 11 is secured to the rotary shaft 9 with a nut 12. An engaging projection 9c, which has a rectangular cross-section as viewed in a direction perpendicular to the axis, is formed at the distal end of the rotary shaft 9. The engaging projection 9c is coupled to a member S, which is located at the output side for an external device. A first conical spring 14 is located between the proximal end surface of the first disk 11 and the inner ring of the first ball bearing 7. On the other hand, a second conical spring 15 is located between the proximal end surface of the flange 9a and the distal end surface of the rotor 10. The first and second disk springs 14, 15 are compressed. The rotary shaft 9, the rotor 10, and the first disk 11 are axially movable in a predetermined range by the force of the first and second disk springs 14, 15. The rotary shaft 9, the rotor 10, and the first disk 11 are located at a substantially middle position within the predetermined movable range.

A stator 21, which constitutes the ultrasonic motor 3 with the rotor 10, is secured to the first housing member 4.

Figure 2A:
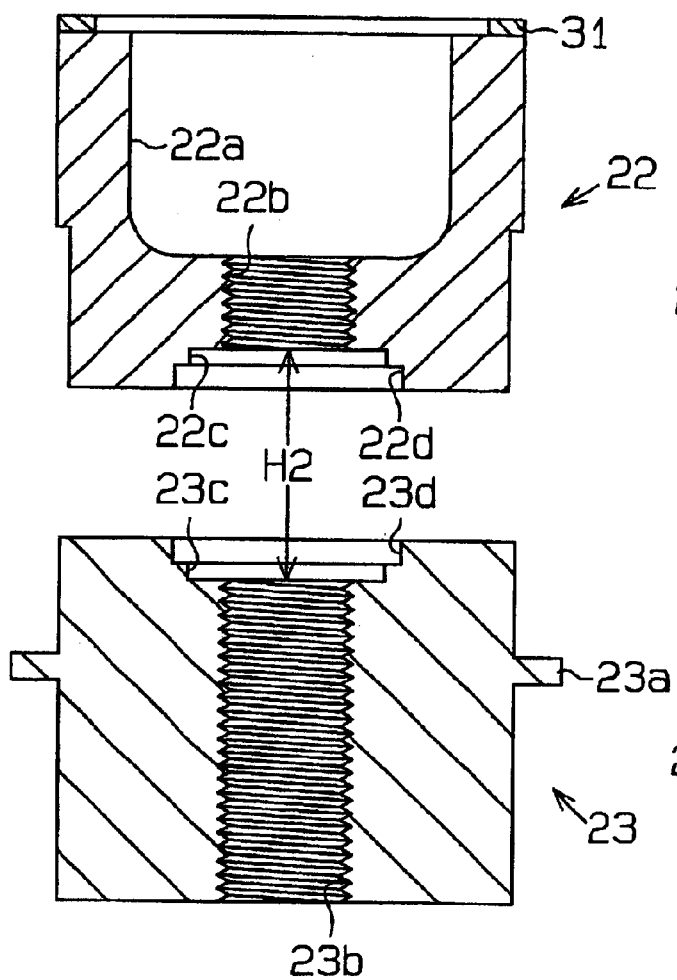
FIG. 2(a) is a cross-sectional view illustrating metal blocks mounted to the actuator shown in FIG. 1.
Figure 2B:
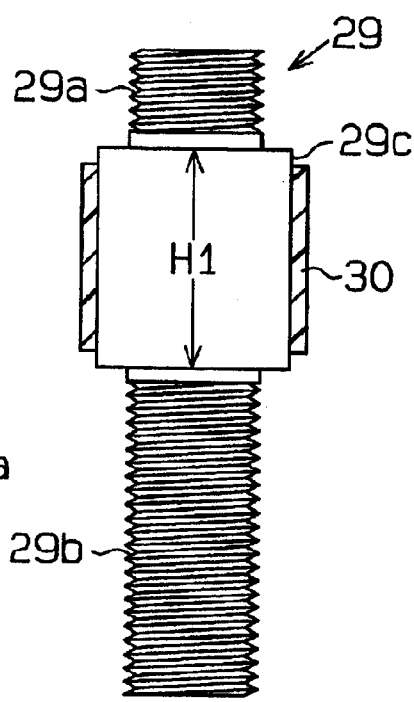
FIG. 2(b) is a cross-sectional view illustrating a tightening member and an insulated collar mounted to the actuator shown in FIG. 1.

The stator 21 includes a first block 22 (see FIG. 2(a)), a second block 23 (see FIG. 2(a)), first and second piezoelectric elements 24, 25, first to third electrode plates 26 to 28, a tightening member 29 (see FIG. 2(b)), and an insulated collar 30.

The first and second blocks 22, 23 are made of conductive metal, which is aluminum alloy in the preferred embodiment.

As shown in FIG. 2(a), the first block 22 is substantially cylindrical. A horn 22a is formed at the upper portion of the first block 22 for amplifying vibration generated at the upper surface of the first block 22. The inner diameter of the horn 22a is greater than the inner diameter of a portion of the first block 22 where the horn 22a is not formed. A female screw 22b, which defines an insertion hole, is formed on the inner circumference of the first block 22.

A first positioning fitting surface 22c, which serves as a positioning surface, is formed at the lower end of the first block 22. The diameter of the first positioning fitting surface 22c is greater than that of the female screw 22b. A first collar fitting surface 22d, which serves as a large diameter portion, is formed at the lower end of the first positioning fitting surface 22c. The diameter of the first collar fitting surface 22d is greater than that of the first positioning fitting surface 22c. A thin friction material 31 is attached to the upper surface of the first block 22.

As shown in FIG. 2(a), the outer diameter of the substantially cylindrical second block 23 is substantially the same as that of the first block 22. An annular supporter 23a, which extends radially outward, is formed on the outer circumferential surface of the second block 23. A female screw 23b, which defines an insertion hole, is formed on the inner circumference of the second block 23.

A second positioning fitting surface 23c, which serves as a positioning surface, is formed at the upper end of the inner circumference of the second block 23. The diameter of the second positioning fitting surface 23c is greater than that of the female screw 23b and the same as that of the first positioning fitting surface 22c of the first block 22. A second collar fitting surface 23d, which serves as a large diameter portion, is formed at the upper end of the second positioning fitting surface 23c. The diameter of the second collar fitting surface 23d is greater than that of the second positioning fitting surface 23c.

Slits (recesses), which are not shown, are formed on the outer circumferential surface of the second block 23 above the supporter 23a for generating torsional vibration based on the axial vibration. Each slit is formed along the circumferential direction and are inclined with respect to the axial direction.

The first and second piezoelectric elements 24, 25 are disk-shaped. A through hole is formed at the center of each of the first and second piezoelectric elements 24, 25. The inner diameters of the first and second piezoelectric elements 24, 25 are substantially the same as the diameter of the second collar fitting surface 23d (see FIG. 2(a)).

The first to third electrode plates 26 to 28 are disk-shaped. A through hole is formed at the center of each of the first to third electrode plates 26 to 28. The inner diameters of the first to third electrode plates 26 to 28 are substantially the same as the diameter of the first collar fitting surface 22d of the first block 22 (see FIG. 2(a)).

As shown in FIG. 2(b), male screws 29a, 29b are formed on the outer circumferential surface of the tightening member 29, which is substantially columnar. The male screws 29a, 29b are screwed to the female screws 22b, 23b, respectively. A columnar body 29c, which serves as a positioning member, is formed at the middle of the tightening member 29. The outer circumferential surface of the columnar body 29c engages with the first and second positioning fitting surfaces 22c, 23c in the radial direction to determine the position of the tightening member 29. The diameter of the columnar body 29c is greater than the diameters of the male screws 29a, 29b. The axial length H1 of the columnar body 29c is slightly less than the distance H2 between the first and second positioning fitting surfaces 22c, 23c when the first and second piezoelectric elements 24, 25 and the first to third electrode plates 26 to 28 are located between the first and second blocks 22, 23. In FIG. 2(a), the distance H2 between the first block 22 and the second block 23 represents the actual distance when the first and second piezoelectric elements 24, 25 and the first to third electrode plates 26 to 28 are located between the first and second blocks 22, 23. The columnar body 29c may be formed separately from one of the male screws 29a, 29b.

The insulated collar 30 is cylindrical and is formed of insulating resin. The outer diameter of the insulated collar 30 is substantially the same as the diameters of the first and second collar fitting surfaces 22d, 23d. The insulated collar 30 is fitted to the first and second collar fitting surfaces 22d, 23d.

As shown in FIG. 1, the second block 23, the third electrode plate 28, the second piezoelectric element 25, the second electrode plate 27, the first piezoelectric element 24, the first electrode plate 26, and the first block 22 are piled on one another in this order and are tightened by the tightening member 29, which extends through the piled components in the axial direction. More specifically, each of the first and second blocks 22, 23 is screwed to the fixed tightening member 29 from the corresponding end. The components are tightened together when the female screws 22b, 23b and the male screws 29a, 29b are screwed to each other. The columnar body 29c of the tightening member 29 is fitted to and radially engaged with the first and second positioning fitting surfaces 22c, 23c (see FIG. 2(a)) of the first and second blocks 22, 23. This determines the radial position of the first and second blocks 22, 23 and the tightening member 29. The insulated collar 30 is fitted to the middle portion of the columnar body 29c of the tightening member 29 and fitted in the first and second piezoelectric elements 24, 25 and the first to third electrode plates 26 to 28. The ends of the insulated collar 30 are fitted in the first and second collar fitting surfaces 22d, 23d of the first and second blocks 22, 23 (see FIG. 2(a)), respectively. The first and second piezoelectric elements 24, 25 are piled on each other such that the polarizing directions are opposite to each other.

As shown in FIG. 1, a second disk 32 is secured to the supporter 23a. Screws 33 are inserted through threaded through holes 32a formed in the second disk 32 and are threaded into the second screw holes 4b of the first housing member 4. The second disk 32 is secured to the first housing member 4 by the screws 33. When the stator 21 is secured, the friction material 31 at the upper surface of the stator 21 presses the proximal end surface of the rotor 10 upward. The first to third electrode plates 26 to 28 are electrically connected to a controller (not shown), which is located outside the housing 2, by conductors (not shown).

The actuator 1 structured as described above generates axial vibration at the first and second piezoelectric elements 24, 25 when the controller applies high frequency voltage to the first to third electrode plates 26 to 28. Then, torsional vibration is generated at the slit (not shown) of the stator 21 based on the axial vibration. Complex vibration of the torsional vibration and the axial vibration is generated on the upper surface of the first block 22 of the stator 21. Levitation force generated by the axial vibration of the stator 21 and the driving force generated by the torsional vibration causes the rotor 10 to rotate, which rotates the rotary shaft 9.

The preferred embodiment provides the following advantages.

The first and second positioning fitting surfaces 22c, 23c are formed in the first and second blocks 22, 23, and the columnar body 29c is formed on the bolt 29 for determining the radial position of the first and second blocks 22, 23 and the columnar body 29c. Therefore, the first and second blocks 22, 23 and the bolt 29 are aligned by a simple structure (simple shape) without increasing the number of components. Thus, the manufacturing deviations of the stator 21 are reduced. Accordingly, variations in the rotational characteristics (such as frequency-rotational speed characteristic, voltage-torque characteristic, and the like) are reduced. As a result, the ultrasonic motor 3 (actuator 1) is easily used for purposes in which a high-accuracy rotational control is required (such as for rotating a drum in a copying machine). This increases the field of application of the ultrasonic motor 3.

The diameters of the first and second positioning fitting surfaces 22c, 23c are greater than the diameters of the female screws 22b, 23b. The columnar body 29c corresponds to the first and second positioning fitting surfaces 22c, 23c and the diameter of the columnar body 29c is greater than the diameters of the male screws 29a, 29b. In this case, the rigidity of the tightening member 29 is not reduced. Thus, the diameters of the male screws 29a, 29b need not be set greater than required for tightening the tightening member 29. Thus, the vibration characteristic of the stator 21 is reliable.

The first positioning fitting surface 22c is formed on one of the ends of the first block 22 that faces the first piezoelectric element 24. The second positioning fitting surface 23c is formed on one of the ends of the second block 23 that faces the second piezoelectric element 25. The columnar body 29c of the tightening member 29 is located at the middle portion of the tightening member 29 and extends in the axial direction. The columnar body 29c engages with the first and second positioning fitting surfaces 22c, 23c. In this case, the first and second blocks 22, 23 are easily assembled from the ends of the tightening member 29. Also, the shape of the tightening member 29 is simplified as compared to a case in which separate columnar body is formed for each of the first and second positioning fitting surfaces 22c, 23c.

The first and second piezoelectric elements 24, 25 are fitted to the middle portion of the columnar body 29c via the insulated collar 30. The first collar fitting surface 22d is formed on the end of the first positioning fitting surface 22c facing the first piezoelectric elements 24. The second collar fitting surface 23d is formed on the end of the second positioning fitting surface 23c facing the second piezoelectric element 25. The diameters of the first and second collar fitting surfaces 22d, 23d are greater than the diameters of the first and second positioning fitting surfaces 22c, 23c and are fitted to the ends of the insulated collar 30. Therefore, the axial length of the insulated collar 30 is longer than the axial length between the first and the second blocks 22, 23, that is, the axial length when the first and second piezoelectric elements 24, 25 (more specifically, including the first to third electrode plates 26 to 28) are piled on each other. Thus, for example, although the insulated collar 30 is thin, the inner circumference of the first and second piezoelectric elements 24, 25 and the inner circumference of the first to third electrode plates 26 to 28 are reliably insulated from the columnar body 29c of the tightening member 29.

The axial length H1 of the columnar body 29c is slightly less than the distance H2 between the first and second positioning fitting surfaces 22c, 23c when the first and second piezoelectric elements 24, 25 and the first to third electrode plates 26 to 28 are located between the first and second blocks 22, 23. Therefore, the columnar body 29c does not limit the axial movement of the first and second blocks 22, 23. That is, the first and second blocks 22, 23 are not prevented from moving toward each other. Thus, the columnar body 29c does not limit the tightening torque of the first and second piezoelectric elements 24, 25 by the first and second blocks 22, 23. As a result, the vibration characteristic of the stator 21 is reliable.

It should be apparent to those skilled in the art that the present invention may be embodied in many other specific forms without departing from the spirit or scope of the invention. Particularly, it should be understood that the invention may be embodied in the following forms.

Figure 3A:
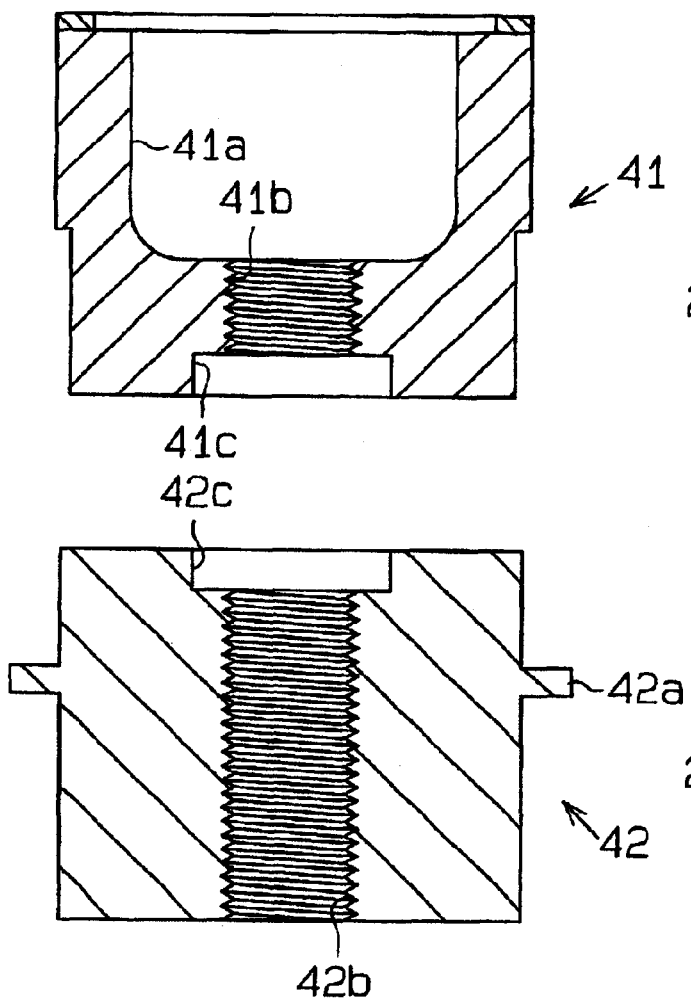
FIG. 3(a) is a cross-sectional view of metal blocks according to a modified embodiment.
Figure 3B:
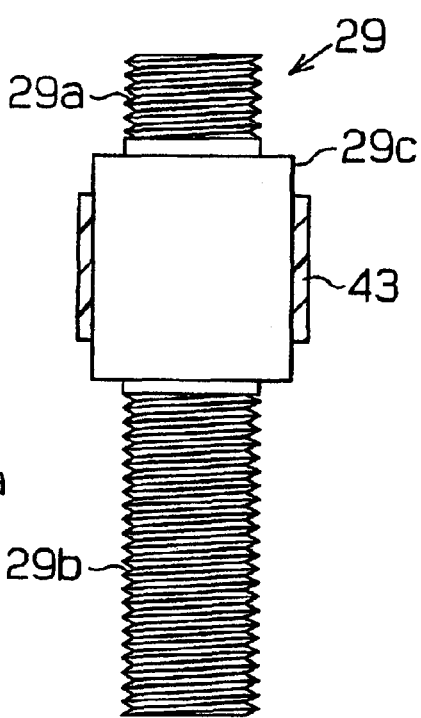
FIG. 3(b) is a cross-sectional view illustrating a tightening member and an insulated collar according to the modified embodiment.
Figure 4:
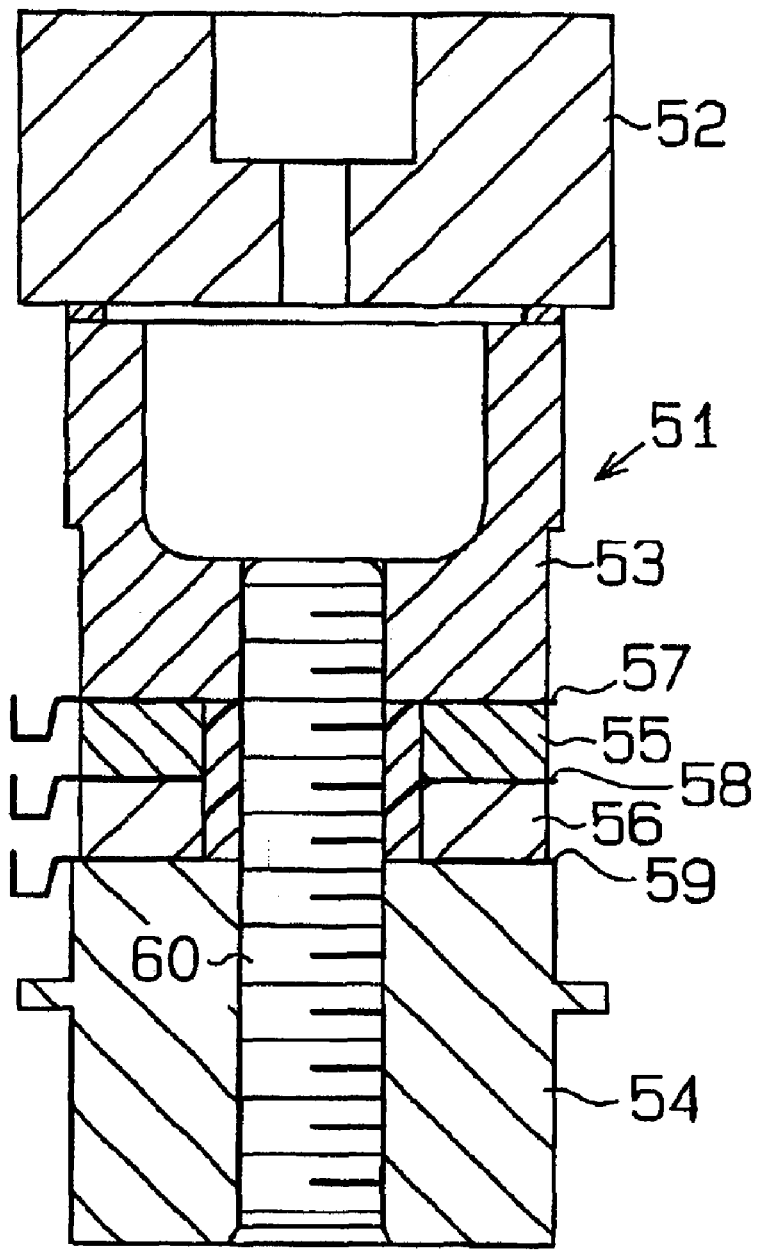
FIG. 4 is a partial cross-sectional view illustrating an ultrasonic motor according to a prior art.

The first and second blocks 22, 23 may have no first and second collar fitting surfaces 22d, 23d. For example, the first and second blocks 22, 23 may be modified as first and second blocks 41, 42 shown in FIG. 3(a). A female screw 41b is formed on the inner circumference of the first block 41 at a portion other than where the horn 41a is formed. A first inner circumferential surface 41c, the diameter of which is greater than that of the female screw 41b, is formed at the lower end of the inner circumference of the first block 41. A disk-like supporter 42a is formed on the outer circumference of the second block 42. A female screw 42b is formed on the inner circumference of the second block 42. A second inner circumferential surface 42c having larger diameter than the female screw 42b is formed at the upper end of the inner circumference of the second block 42. The modified embodiment provides the same advantages as the preferred embodiment. In this case, the axial length of the insulated collar 43 (see FIG. 3(b)) needs to be less than or equal to the shortest distance between the first and second blocks 41, 42, or the axial length between the first and second blocks 41, 42 when the first and second piezoelectric elements 24, 25 and the first to third electrode plates 26 to 28 are piled on one another.

Other positioning member may be formed on the first and second blocks 22, 23 and the tightening member 29 as long as the position in the radial direction is determined.

The diameters of the first and second positioning fitting surfaces 22c, 23c may be less than the diameters of the female screws 22b, 23b, and the diameter of the columnar body 29c may be less than the diameters of the male screws 29a, 29b as long as the position in the radial direction is determined.

A separate columnar body, which serves as a positioning member, may be formed on the tightening member 29 corresponding to each of the first and second positioning fitting surfaces 22c, 23c.

Therefore, the present examples and embodiments are to be considered as illustrative and not restrictive and the invention is not to be limited to the details given herein, but may be modified within the scope and equivalence of the appended claims.

What is claimed is:

1. An ultrasonic motor comprising:
   a stator, wherein the stator includes:
      a pair of metal blocks;
      a piezoelectric element located between the metal blocks, wherein, when drive voltage having a predetermined frequency is applied to the piezoelectric element, the piezoelectric element vibrates the stator;
      a tightening member, which is inserted through the metal blocks and the piezoelectric element to tighten the metal blocks and the piezoelectric element in the axial direction;
      a positioning member for determining the radial position of the metal blocks; and
   a rotor, which is press fit to the stator and rotates in accordance with the vibration of the stator.

2. The ultrasonic motor according to claim 1, wherein the positioning member is formed on the tightening member.

3. The ultrasonic motor according to claim 2, wherein the positioning member is integrally formed with the tightening member.

4. The ultrasonic motor according to claim 2, wherein each metal block has an inner circumferential surface, which defines an insertion hole through which the tightening member is inserted, and wherein the positioning member is radially fitted to the inner circumferential surfaces.

5. The ultrasonic motor according to claim 2, wherein each metal block has an inner circumferential surface, which defines an insertion hole through which the tightening member is inserted, wherein a female screw is formed on the inner circumferential surface of each metal block, and a male screw is formed on the tightening member to be screwed to the female screws, wherein the inner circumferential surface of each metal block has a positioning surface at a portion where the female screw is not formed, and wherein the positioning surface engages with the tightening member.

6. The ultrasonic motor according to claim 5, wherein the positioning member is a columnar body, which has an outer circumferential surface, wherein the outer circumferential surface engages with the positioning surfaces.

7. The ultrasonic motor according to claim 6, wherein the diameters of the positioning surfaces are greater than the diameters of the female screws, and wherein the diameter of the columnar body corresponds to the diameters of the positioning surfaces.

8. The ultrasonic motor according to claim 6, wherein a part of the insertion hole defined by each positioning surface is open at an end of the corresponding metal block that faces the piezoelectric element, wherein the columnar body is inserted through the piezoelectric element, which is located between the metal blocks, and the axial ends of the columnar body engage with the positioning surfaces.

9. The ultrasonic motor according to claim 8, wherein a cylindrical insulated collar is fitted about the columnar body, and the piezoelectric element is fitted about the insulated collar, wherein each insertion hole has a large diameter portion at a portion closer to the piezoelectric element than the positioning surface, wherein the diameters of the large diameter portions are greater than the diameters of the positioning surfaces, and wherein the inner circumferential surfaces that define the large diameter portions are fitted to the insulated collar.

10. A stator located in an ultrasonic motor, wherein the stator comprising:
   a pair of metal blocks;
   a piezoelectric element located between the metal blocks, wherein, when drive voltage having a predetermined frequency is applied to the piezoelectric element, the piezoelectric element vibrates the stator;
   a tightening member, which is inserted through the metal blocks and the piezoelectric element to axially tighten the metal blocks and the piezoelectric element; and
   a positioning member for determining the position of the metal blocks in the radial direction.

11. An ultrasonic motor comprising:
   a stator, wherein the stator includes:
      a pair of metal blocks having end surfaces that face each other, wherein each metal block includes an insertion hole, which extends in the axial direction of the metal block, wherein a female screw is formed on the inner circumferential surface of each insertion hole, wherein each insertion hole has an opening, which is open at the corresponding end surface, and wherein a portion of each insertion hole that is close to the opening is defined by a positioning surface;
      a piezoelectric element located between the metal blocks, wherein, when drive voltage having a predetermined frequency is applied to the piezoelectric element, the piezoelectric element vibrates the stator;
      a tightening member for tightening the metal blocks and the piezoelectric element in the axial direction, wherein the tightening member includes a columnar positioning member and a pair of male screws, which extend in different directions from the positioning member, wherein each male screw is screwed to the corresponding female screws, wherein the positioning member is inserted through the piezoelectric element and is engaged with the positioning surfaces to determine the radial position of the metal blocks; and a rotor, which is press fit to the stator and rotates in accordance with the vibration of the stator.

12. The ultrasonic motor according to claim 11, wherein the diameter of the positioning surface is greater than the diameters of the female screws, and the diameter of the positioning member corresponds to the positioning surface.

13. The ultrasonic motor according to claim 11, wherein a cylindrical insulated collar is fitted about the positioning member, and the piezoelectric element is fitted about the insulated collar, wherein each insertion hole has a large diameter portion, which has a diameter greater than that of the corresponding positioning surface, at a portion closer to the piezoelectric element than the positioning surface, and wherein the inner circumferential surfaces that define the large diameter portions are fitted to the insulated collar.

* * * * *